Sept. 15, 1964 E. A. QUADE 3,149,316
INDUCTIVE MATRIX ARRANGEMENT FOR SENSING MAGNETIC CONFIGURATIONS
Original Filed Jan. 25, 1957 2 Sheets-Sheet 1

INVENTOR.
EDWARD A. QUADE
BY
Baylor G. Riddell
ATTORNEY

United States Patent Office 3,149,316
Patented Sept. 15, 1964

3,149,316

INDUCTIVE MATRIX ARRANGEMENT FOR SENSING MAGNETIC CONFIGURATIONS

Edward A. Quade, San Jose, Calif., assignor to International Business Machines Corporation, New York, N.Y., a corporation of New York Continuation of application Ser. No. 636,281, Jan. 25, 1957. This application Sept. 9, 1960, Ser. No. 54,900
10 Claims. (Cl. 340—166)

This invention relates in general to matrix type devices in which a first set of conductors are arranged in selective energy translating relationship with a second set of conductors, and in particular to an improved arrangement for effecting the transfer of energy between selected conductors. This application is a continuation of my application filed January 25, 1957, entitled as above and having Serial No. 636,281, now abandoned.

A useful means for transforming information into coded form which is readily handled by electrical and electronic computing machines is a matrix type device in which a plurality of input conductors, each representing a specific bit of information, are selectively connected to a plurality of output conductors which represent components of the code being employed. Such devices are commonly employed, for example, in transferring numeric information in the decimal system to information in the binary system or the binary coded decimal system, wherein each input conductor of the matrix represents a different decimal integer and is selectively connected to one or more of the output conductors which represent components of the binary code. Since an output conductor may be connected to several input conductors and vice versa, means must be provided to prevent so called "back circuits." These back circuits are formed between various input and output conductors as a result of certain of the output conductors being connected to at least two common input conductors. Such back circuits are described in R. K. Richards, "Arithmetic Operations in Digital Computers," 1955, on pp. 42–44.

To prevent these back circuits the prior art has suggested employing strategically located unidirectional current conducting devices such as rectifiers. The use of rectifiers in a matrix device satisfactorily eliminates back circuits but increases both the initial cost of manufacturing and the cost of maintaining the matrix since the rectifiers must be perodically replaced.

In accordance with the present invention, a matrix type device is provided in which the back circuit problem is eliminated and energy transfer between an input conductor and an output conductor is obtained by a magnetic coupling effect.

It is therefore an object of the present invention to provide an improved matrix type device in which the problem of back circuits is eliminated.

Another object of the present invention is to provide an improved means for transferring energy between input and output conductors of a matrix type device.

Other objects of the invention will be pointed out in the following description and claims and illustrated in the accompanying drawings, which disclose, by way of example, the principle of the invention and the best mode which has been contemplated of applying that principle.

Briefly stated, according to the present invention in its simplest form, an input conductor and an output conductor are provided and arranged with respect to each other so that energizing the input conductor to create a varying magnetic field therearound will effect substantially no magnetic coupling with respect to the output conductor. This is due to the minimal intersection of the flux plane by the output conductor. However, the supporting of a low reluctance material in a plane closely adjacent this intersection in a manner to vary the plane of the magnetic flux being generated will thereby produce a detector coupling with respect to the two conductors. Such may be achieved, for example, by providing magnetic material on a substrate such as a card or paper. The general principle here, however, extends to any two detectably different conditions of magnetic coupling between these two conductors. However, in the preferred arrangement, the conductors are oriented substantially at right angles in order to achieve an optimum change in the coupling condition. In addition, the orientation of the magnetic element supported at those intersections to be coupled should be such as to provide what may be called a magnetic angular relationship with respect to the plane of the flux generated in the input conductor, e.g. either by disposing the magnetic element itself at an angle to the input conductor or by providing an "easy" direction of magnetization so disposed, or in any other suitable manner.

Figure 1:
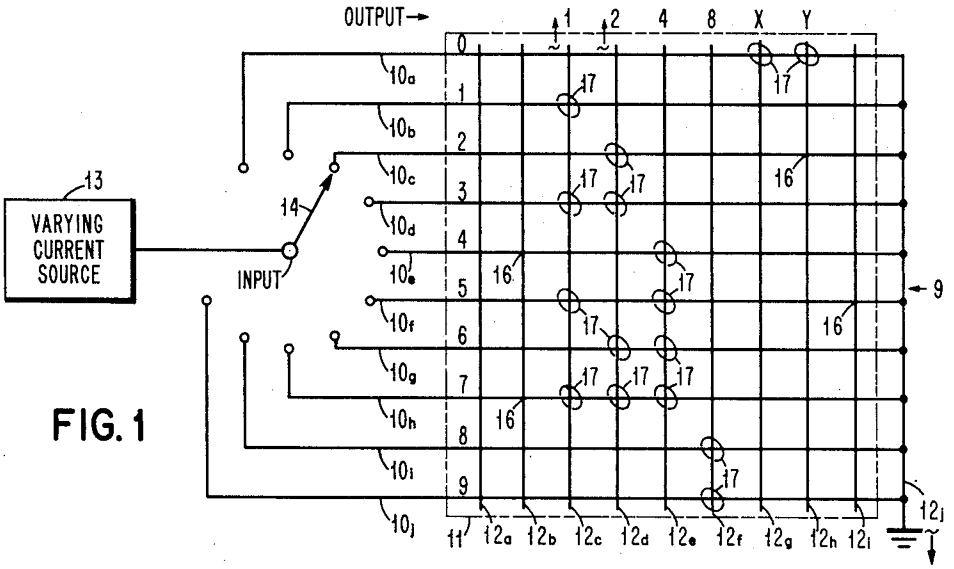
FIG. 1 illustrates schematically an embodiment of the present invention in a matrix type device for converting decimal information to binary information.

Referring to the drawing, and particularly to FIG. 1, a matrix type device 9 is illustrated in which a set of input conductors 10*a* through 10*j* are arranged with respect to a set of output conductors 12*a* through 12*i* so as to convert information from a decimal numbering system to a binary numbering system. As shown, the input conductors 10*a* through 10*j* correspond to the integers 0 through 9 of the decimal numbering system and are arranged so that each conductor 10 may be selectively connected to a source 13 of varying current, e.g. alternating current, by means of a suitable switch 14. The output conductors 12 are arranged so that they intersect input conductors 10 to define a number of matrix points 16. Certain of these points 16 are chosen as active points depending on the particular code being employed. In FIG. 1 the active points chosen for the binary code are designated by reference character 17 and are enclosed with a circle, the remaining points being inactive. At the inactive points the output conductors 12 intersect the input conductors 10 substantially parallel to the planes of the magnetic fields produced when these latter conductors are energized. One such inactive point is shown in FIG. 2 On the other hand, the active points 17 arranged in a coding pattern are provided with means supported on a common substrate 11 for magnetically coupling the output conductors 12 to the input conductors 10 so that a transfer of energy takes place at these points.

Figures 2, 3, 4:
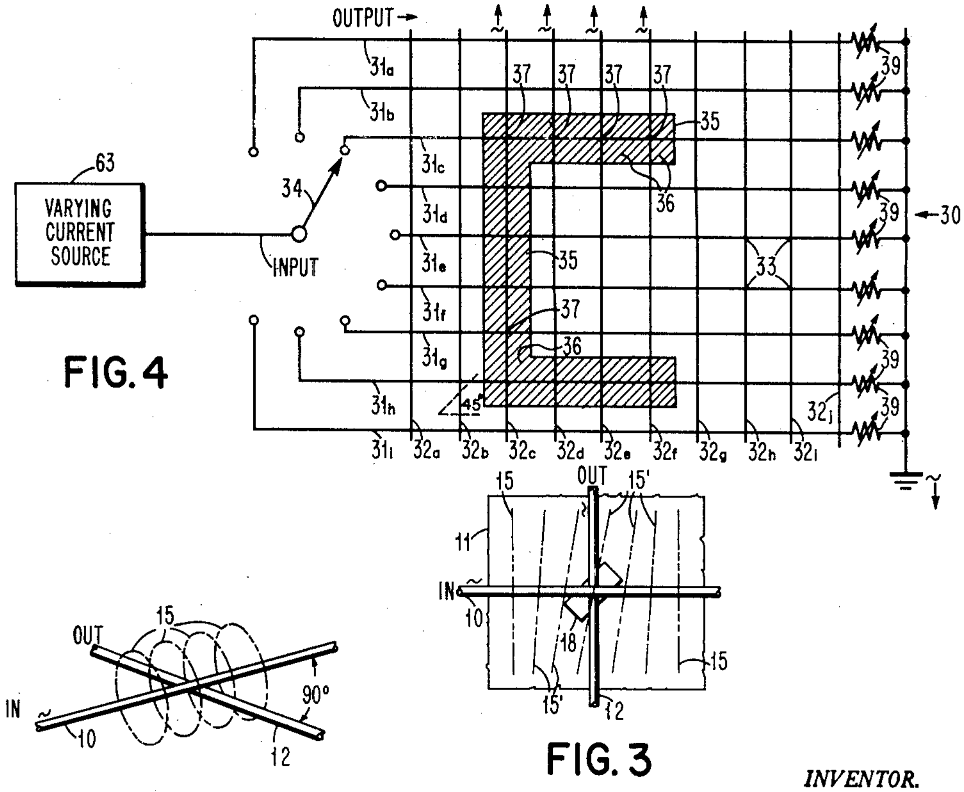
FIG. 2 illustrates diagrammatically an inactive matrix point at which an input conductor is disposed with respect to an output conductor so that there is substantially no magnetic coupling between the conductors.
FIG. 3 illustrates diagrammatically a matrix point rendered active by a permeable member supported by a plane surface, such as a card, closely adjacent the intersection of two conductors to obtain a transfer of energy between the input conductor and the output conductor by means of a magnetic coupling effect.
FIG. 4 illustrates diagrammatically a further embodiment of the invention wherein the matrix is employed as a magnetic character sensing device.

The magnetic coupling between an input conductor 10 and an output conductor 12 may be provided by a magnetic permeable member disposed at an angle with respect to the plane 15 of the magnetic field produced by the input conductor, as shown in FIG. 3. In this manner, the planes 15 of the flux generated are oriented to intersect output conductor 12. In FIG. 3 the magnetic member is supported on a surface 11 and comprises a rectangular soft iron element or slug 18 disposed at an angle to the normal plane 15 of the field, preferably at a 45° angle. In the drawings, the numeral 15 has been applied to the undisturbed flux planes, while 15' refers to those planes 15 influenced by the presence of a low reluctance element 18. Configurations other than those shown are also possible.

The operation of matrix type devices similar to that shown in FIG. 1 is well known, and hence a detailed description does not appear to be warranted. However, to convert a particular decimal integer, e.g. "7," into its binary code equivalent, the input conductor 10*h* corresponding to integer 7 is energized with alternating current from source 13 which causes output conductors 12*c*, 12*d* and 12*e* representing the 1, 2 and 4 components of the binary code to be energized, the matrix points 17 defined by the intersection of input conductor 10*h*, with output conductors 12*c*, 12*d* and 12*e* having been made active by any of the arrangements previously described.

FIG. 4 illustrates an embodiment of the invention in which a matrix type device is employed using the principle shown in FIGS. 1 and 3 as a magnetic character sensing head. As shown in FIG. 4, the character sensing head 30 comprises a set of input conductors 31*a* through 31*j* and a set of output conductors 32*a* through 32*j* which are arranged to define a plurality of matrix points 33. Suitable means, such as a switch 34 and a source of varying voltage 63, are provided for sequentially energizing input conductors 31 with a varying voltage. The output conductors 32 are positioned parallel to the planes of the magnetic fields produced as a result of energizing the input conductors 31 so that there is substantially no magnetic coupling between the input conductors 31 and the output conductors 32 when the head 30 is not sensing a magnetic character. However, if a character 35 formed on a substrate and defined by a suitable magnetic material is positioned parallel to the recording face of the head 30, certain matrix points will be made active depending on the shape of the character or pattern being sensed. That is, portions of character 35 directly adjacent these certain matrix points cause a magnetic coupling between associated input and output conductors at the matrix point. As shown in FIG. 4, the character C defined by striped lines 36 of magnetic material disposed at an angle, preferably 45°, or given an "easy" direction of magnetization at a substantial angle with respect to the planes of the magnetic fields produced by the input conductors 31, causes certain matrix points 37 to be made active. As mentioned above, the same effect as this striping of lines 36 may be achieved by other suitable means such as orienting the "easy" direction of magnetization at an angle to the magnetic field of the input conductor 31. By sequentially energizing each input conductor 31, energy is transferred to the output conductors 32 in a predetermined timed relationship. As shown in FIG. 4, input conductor 31*c* is being energized, causing an energy transfer to output conductors 32*c*, 32*d*, 32*e* and 32*f*. Energizing the next input conductor 31*d* causes a transfer of energy to output conductor 32*c*. It will be seen that an output from the head 30 is obtained which is directly related to the magnetic pattern being sensed, just as the output from conductors 12 reflected a predetermined pattern, or disposition of magnetic material on surface 11.

The manner in which the output of the head is employed forms no part of the present invention and therefore is not illustrated or described. However, it should be apparent that various well known arrangements are possible.

Figures 5, 6, 7:
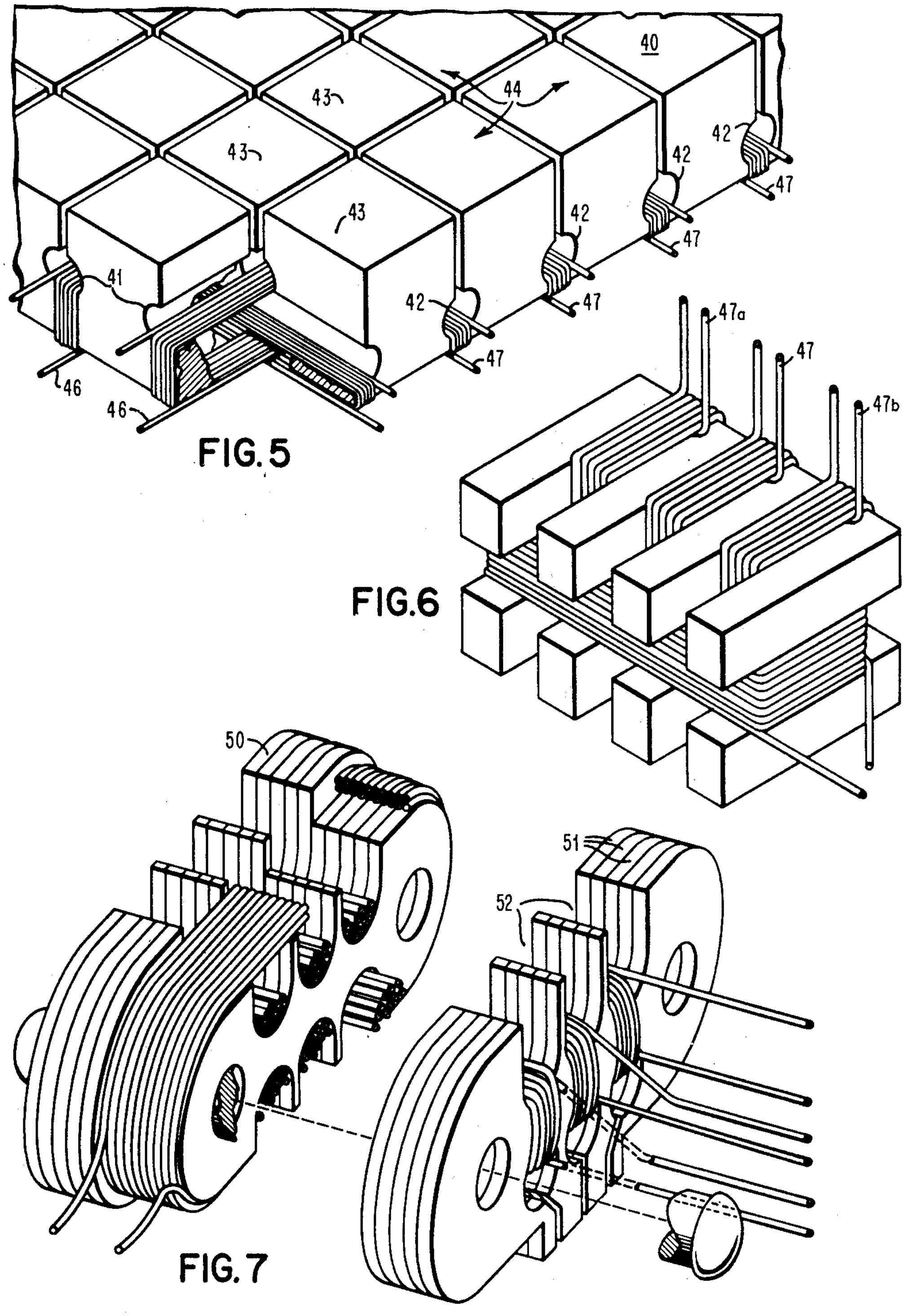
FIG. 5 is a partial view of a character sensing head illustrated diagrammatically in FIG. 4.
FIGS. 6 and 7 illustrate further modifications of the magnetic character sensing matrix shown in FIG. 4.

FIG. 5 is an enlarged perspective view of a portion of a matrix type magnetic character sensing head shown diagrammatically in FIG. 4. The sensing head as shown in FIG. 5 comprises a core member 40 of permeable material which is provided with a plurality of key-hole shaped passages for receiving input and output conductors. The passages 41 for the input conductors are disposed in a plane in parallel spaced relationship. The passages 42 for the output conductors are similarly disposed but extend normally to the axis of passages 41. As a result, a grid-like pattern having uniform sections 43 is formed on the reading face 44 of the head. The input and output conductors are wound on the core 40 in the form of coils 46 and 47, respectively, so as to increase the sensitivity of the head in reading characters which may be printed with various types of magnetic permeable material. However, the turns of the output coils 47 are substantially parallel to the magnetic field provided by energizing input coils so that substantially no energy is transferred until a portion of the magnetic character being sensed renders the matrix points active. The matrix points are rendered active by a portion of the character being sensed providing a low reluctance path between diagonally adjacent sections 43 of the grid-like pattern on the reading face 44 of the head.

FIG. 6 illustrates a modification of the character sensing arrangement shown in FIG. 5, in which the core member 40 of the head is modified so as to increase the number of output coils 47 associated with a particular area of the head. The matrix shown in FIG. 6 is identical in function to that shown in FIG. 5 except for the provision of additional coils 47*a* and 47*b* on both sides of the main output coil 47. Such an arrangement allows a number of separate output devices to be operated by the head.

FIG. 7 is an exploded view illustrating a further embodiment of a magnetic character sensing head employing a plurality of coils for each output circuit of the matrix. As shown, the core portion 50 of the head is formed from laminated members 51 provided with coil receiving slots 52. The function of the head is similar to that described in connection with FIGS. 5 and 6.

While there have been shown and described and pointed out the fundamental novel features of the invention as applied to the preferred embodiments, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. A matrix device comprising:

a plurality of cross-positioned input and output current conductor means defining normally inactive matrix points; and means for inductively coupling said normally inactive matrix points comprising a unitary support having thereon field-distorting magnetic strip means arranged to define discrete character information, said support being positionable adjacent said matrix points to effect inductive coupling of said magnetic strip means with selected ones of said matrix points to provide signal outputs on the output conductors forming part of said selected matrix points.

2. A matrix device comprising, in combination:

a plurality of cross-positioned input and output conductor means defining normally inactive matrix points; and means for inductively coupling said normally inactive matrix points comprising a unitary support having thereon field-distorting magnetic permeable planar strips misoriented with respect to said input and output current conductor means, said support being positionable adjacent said matrix points to effect inductive coupling of said magnetic planar strips with selected ones of said matrix points to provide signal outputs on the output conductors forming part of said selected matrix points.

3. A matrix device comprising:
a plurality of cross-positioned input and output current conductor means defining normally inactive matrix points;
means for inductively coupling said normally inactive matrix points comprising a unitary support having thereon field-distorting magnetic strip means arranged to define discrete character information, said support being positionable adjacent said matrix points to effect inductive coupling of said magnetic strip means with selected ones of said matrix points; and
means to selectively energize said input conductors so that said magnetic strip means provide signal outputs on the output conductors forming part of said selected matrix points defined by said selected input conductors.

4. A matrix device comprising:
a core member;
a plurality of parallel input coils and a plurality of parallel output coils disposed on said core member in cross-positioned fashion to define a plurality of normally inactive matrix points; and
means for inductively coupling said normally inactive matrix points comprising a unitary support having thereon field-distorting magnetic strip means arranged to define discrete character information, said support being positionable adjacent said matrix points to effect inductive coupling of said magnetic strip means with selected ones of said matrix points to provide signal outputs on the output coils forming part of said selected matrix points.

5. The combination recited in claim 4 in which a plurality of output coils are associated with each said matrix point.

6. The combination recited in claim 4 further including means to selectively energize said input coils.

7. A matrix device comprising:
a plurality of cross-positioned input and output current conductor means defining normally inactive matrix points;
means for inductively coupling said normally inactive matrix points comprising a unitary support having thereon field-distorting magnetic strip means, said magnetic strip means being arranged to define human-readable character information, said support adjacent and parallel to said matrix points to effect inductive coupling of said magnetic strip means with selected ones of said matrix points to thereby provide signal outputs on the output conductors forming part of said selected matrix points.

8. A matrix device comprising:
a plurality of input current conductors;
a plurality of output current conductors electrically insulated from and disposed with respect to said input conductors to form a plurality of matrix points;
a unitary supporting substrate disposed adjacent and parallel to said plurality of matrix points; and
field-distorting magnetic strip means disposed upon said supporting substrate and arranged to define discrete character information, said magnetic strip means effecting inductive couplings with selected ones of selected matrix points to provide signal outputs on the output conductors forming part of said selected matrix points.

9. The invention according to claim 8 further including means to energize said input conductors in a predetermined sequence.

10. A character sensing system comprising:
a character formed of magnetic material upon a unitary planar substrate;
a device for sensing said character including a core member, a plurality of input coils and a plurality of output coils disposed on said core member to define a plurality of normally inactive matrix points, said core member having a reading face defined by said plurality of matrix points;
positioning means for positioning said reading face of said core member parallel to and adjacent said planar substrate to effect inductive coupling of said magnetic material with selected ones of said matrix points; and
means for energizing said input coils in a predetermined sequence to cause an energy transfer to the output conductors forming part of said selected matrix points.

References Cited in the file of this patent

UNITED STATES PATENTS

| | | |
|---|---|---|
| 2,657,272 | Dimond | Oct. 27, 1953 |
| 2,814,031 | Davis | Nov. 19, 1957 |
| 2,907,988 | Duinker | Oct. 6, 1959 |
| 3,027,548 | Vaughan | Mar. 27, 1962 |

FOREIGN PATENTS

| | | |
|---|---|---|
| 760,048 | Great Britain | Oct. 31, 1956 |